G. B. PERKINS.
VEHICLE ATTACHMENT.
APPLICATION FILED MAR. 11, 1919.
1,383,847.
Patented July 5, 1921.
3 SHEETS—SHEET 1.
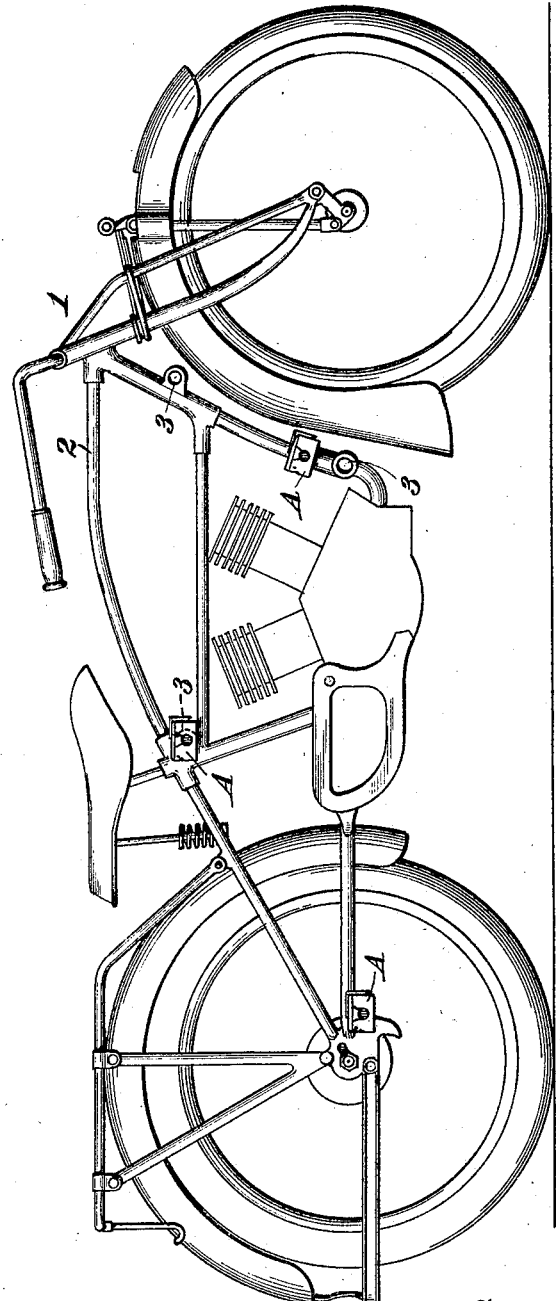
Inventor
George B. Perkins.
By Edgar M Kitchin
His Attorney

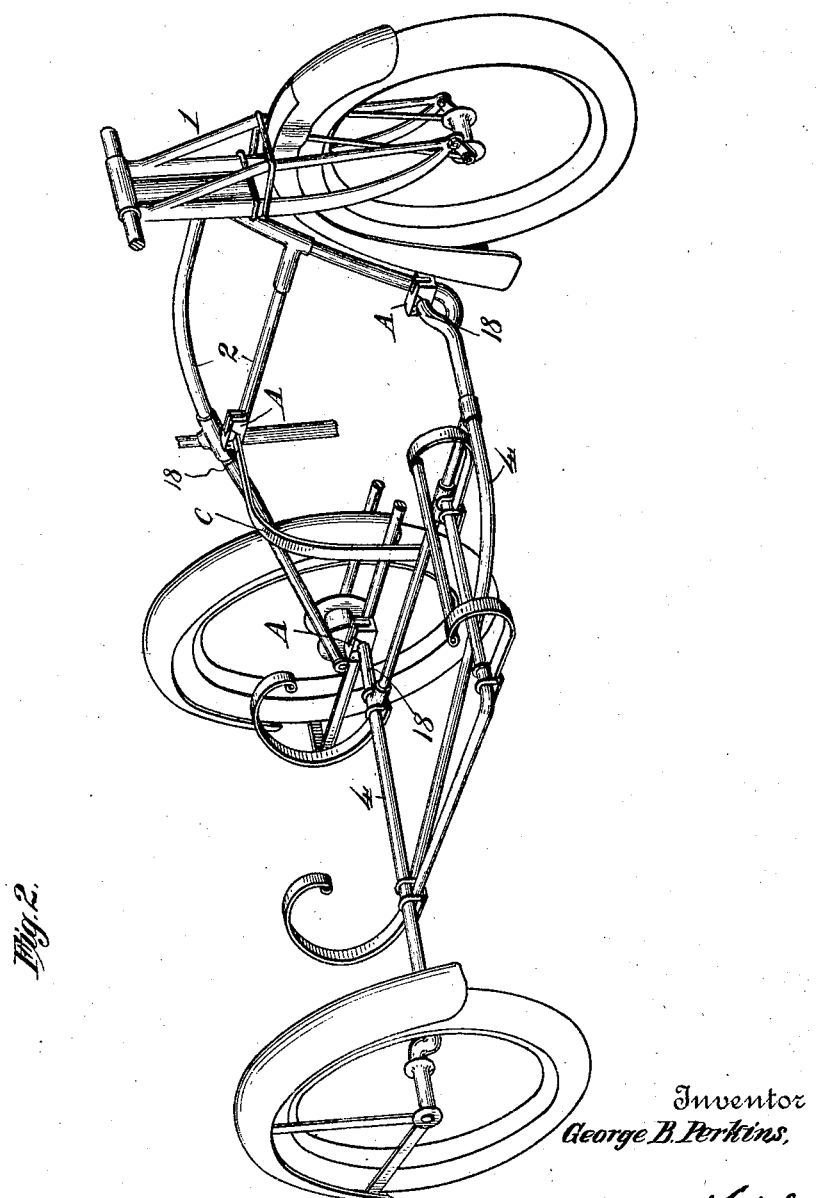

G. B. PERKINS.
VEHICLE ATTACHMENT.
APPLICATION FILED MAR. 11, 1919.
1,383,847.
Patented July 5, 1921.
3 SHEETS—SHEET 3.
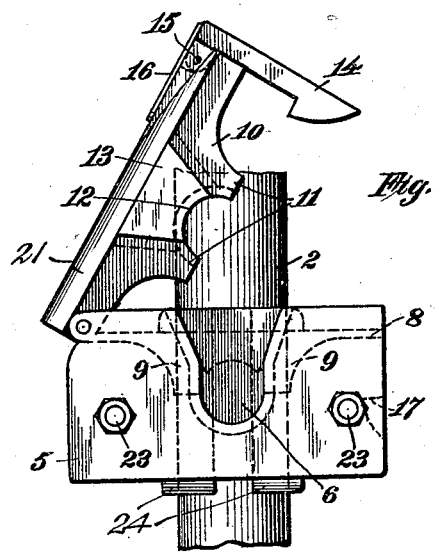
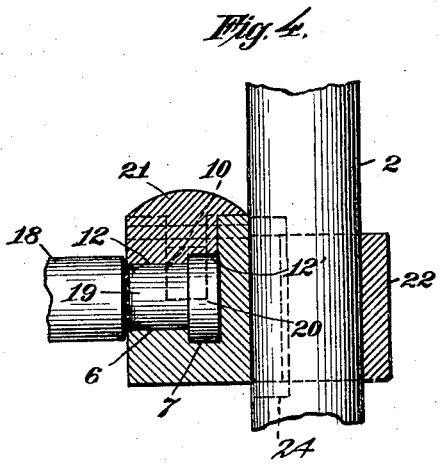
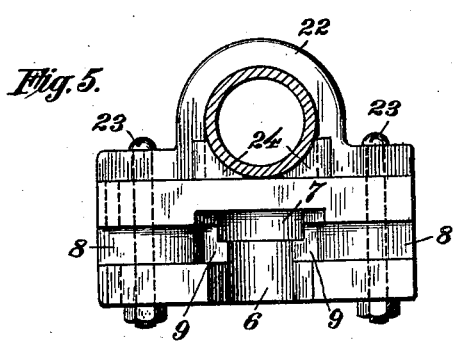
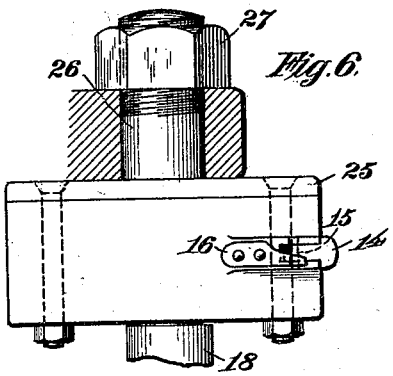
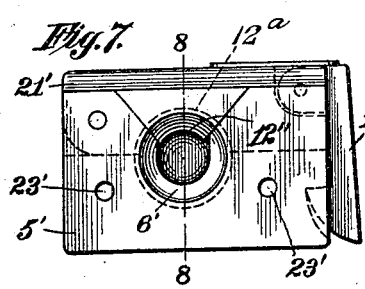
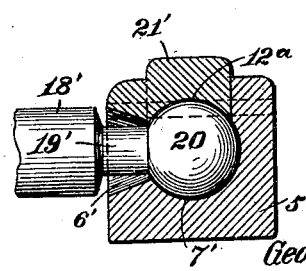
Inventor
George B. Perkins,
By Edgar M. Kitchin
His Attorney.

UNITED STATES PATENT OFFICE.

GEORGE BEN. PERKINS, OF FARMINGTON, MISSOURI.

VEHICLE ATTACHMENT.

1,383,847.   Specification of Letters Patent.   Patented July 5, 1921.

Application filed March 11, 1919. Serial No. 281,917.

*To all whom it may concern:*

Be it known that I, GEORGE B. PERKINS, a citizen of the United States, residing at Farmington, in the county of St. Francois and State of Missouri, have invented certain new and useful Improvements in Vehicle Attachments; and I do hereby declare the following to be a full, clear, and exact description of the invention, such as will enable other skilled in the art to which it appertains to make and use the same.

This invention relates to improvements in side attachments for vehicles, and is designed to function as particularly effective in its adaptation to the side car of a motorcycle.

The primary object in view is the provision of means for facilitating rapid and easy connection and disconnection of the side attachment to a vehicle while insuring strength and durability of such connection.

With this and further objects in view, as will in part be hereinafter stated and in part become apparent, the invention comprises certain novel constructions, combinations and arrangements of parts as subsequently specified and claimed.

In the accompanying drawings,—

Figure 1 is a view in side elevation of a motorcycle having applied thereto an embodiment of the present invention.

Fig. 2 is a perspective view of the same with the frame of a side-car shown in its operative position, parts being broken away.

Fig. 3 is an enlarged detail side elevation of one of the attaching members, a fragment of the motorcycle frame being shown therewith.

Fig. 4 is a vertical section therethrough taken on the plane indicated by line 4—4 of Fig. 3, with the locking plate in its closed position.

Fig. 5 is a plan view thereof, the pivoted locking plate being omitted and the fragment of frame being seen in horizontal section.

Fig. 6 is a view similar to Fig. 5, showing the locking plate in its closed position and illustrating a slightly modified form of frame-engaging part.

Fig. 7 is a side elevation of a slightly modified form of the attaching member detached.

Fig. 8 is a transverse section through the parts seen in Fig. 7, the section being taken on the plane indicated by line 8—8 of Fig. 7, and the frame-engaging clamp being omitted.

Referring to the drawings by numerals, 1 indicates a motorcycle having all the usual parts including the frame 2 and attaching eyes 3, 3. Attaching members A, A are connected to the motorcycle, some to the attaching eyes 3, 3, and one directly to the frame 2. To these attaching members A, A is connected the frame 4 of a side car. Each of the attaching members A is identical with all the others, but the form of motorcycle-frame-engaging part varies according to the location of the respective attaching members A, and also according to whether or not it is connected directly to the frame 2 or to an eye 3. Hence, it will be apparent that a detail disclosure of one of the attaching members A will suffice for all. One of the attaching members has accordingly been disclosed in Figs. 3, 4, 5 and 6, the eye-engaging type of the frame-engaging part of the attaching member being seen in Fig. 6, while the other three figures of this group disclose the means for fixing the attaching member to the frame, 2, but the attaching member itself is the same in both cases, and functions the same regardless of the means by which it is connected to the motorcycle frame. Hence, the same reference numerals will be used in Figs. 3, 4, 5 and 6 for corresponding parts of the attaching member. The attaching member consists essentially of a socket plate 5 and a locking plate 21 with their coöperating parts. The socket plate 5 may be considered the body of the attaching member from its preponderance in bulk and from its anchorage to the motorcycle frame. This socket plate 5 is formed with a parti-circular bore or bearing recess socket 6 which has an undercut portion or enlargement 7 at its inner end. A groove 8 extends throughout the length of the upper edge portion of plate 5 and is provided with deepened and downwardly curved enlargements 9, 9 where the groove coincides with the socket 6. The material of the plate 5 is cut away above the socket 6, and the opening thus produced flares upwardly to conform with the shape of a keystone filler block. The cut-away portion extends upwardly from socket 6 to the upper edge of the plate 5 and forms a means of edgewise access to the socket. Thus a cylindrical shaft with an annular enlarged head has free edgewise access to the socket 6.

The locking plate 21 is formed with a longitudinal, depending web 10 shaped and proportioned to be accommodated within and to fill the groove 8 with its enlargements 9. The said web has projections 11, 11 to fill the enlarged recesses 9, 9 and is formed with an arcuate notch 12 between the projections 11, positioned and proportioned to continue the curve of socket 6, when the plate 21 is in its closed position, whereby the socket is actually completed. The web 10 is provided with a laterally outstanding keystone-shaped filler block 13, positioned and proportioned to lie within and fill the opening above that part of socket 6 extending through the outer web of plate 5. The under face of filler block 13 is formed with a continuation of the arcuate notch 12. The web 10 is pivotally connected at one end to the plate 5, so as to allow the locking plate to be swung from the releasing position, seen in Fig. 3, to the locked position, seen in Figs. 4 and 6. A detent or locking snap 14 is pivoted at 15 to the free end portion of the locking plate 21, and is pressed by spring 16 for holding the detent in locking engagement with the notch 17 in plate 5, when the locking plate 21 is in its lowered or locking position as indicated in Figs. 4 and 6.

Regardless of the method of anchorage of each attaching member A, it will be seen that the member always functions the same with respect to the part which it engages. This part usually assumes the form of a shaft 18, having a reduced extension 19 and an enlarged, circular head 20. The extension or bearing 19 is proportioned to fit within socket 6 when the locking plate 21 is in its closed position as indicated in Figs. 4 and 6. The notch 12 is slightly enlarged at its inner portion as indicated at 12' to accommodate the upper portion of the head 20. The parts are proportioned relative to each other such as to either firmly clamp the thus engaged end of shaft 18 when it is desired to maintain a rigid connection, but usually it is preferable, with most of the connections between the side car and the motorcycle frame, to allow for a slight amount of play, and this is done merely by having the bearing 19 and head 20 proportioned to afford the desired play in the socket 6. Or, where a considerable amount of freedom for play is desired in a lateral direction, with respect to the engaged shaft, without any longitudinal vibration of the shaft, the construction shown in Figs. 7 and 8 may be employed. Of course, in the form shown in Figs. 3, 4, 5 and 6, there is a snug fit of the parts of plate 5 between the annular shoulders at the ends of the bearing 19, whereby longitudinal play of shaft 18 is avoided even when lateral play is provided.

The method of connection of each attaching member A to the motorcycle frame is not vital, and may be varied widely without in the slightest varying the form or function of the attaching member itself. In Figs. 3, 4 and 5, the connection to the frame is shown as consisting of a substantially U-shaped clamping plate 22, connected by bolts 23, 23 to the body 5 of the attaching member. Fillers 24, 24 are employed to avoid possibility of looseness and to insure rigid connection of the attaching member to the frame. When, however, the attaching member is to be connected at a point where the frame is provided with an eye, bolts similar to 23 are employed to fasten the attaching member to plate 25 which has an integral or rigidly fixed, laterally-extending bolt 26, proportioned to extend through the eye 3 and adapted to be rigidly connected thereto by the securing nut 27.

In the form of attaching member seen in Figs. 7 and 8, the body portion 5' is formed with grooves and recesses corresponding to those of body portion 5, except that the head-receiving recess 7' is parti-globular and the recess 6' is flared outwardly from the recess 7', the notch 12'' in the web of the locking plate 21' correspondingly flaring, and the enlargement 12ª of the notch continuing the globular formation of recess 7' for accommodating a ball 20 carried by the reduced portion or neck 19' of the shaft 18'.

The locking detent 14' is the same in form and function and possesses the same corresponding parts as detent 14. The body 5' is formed with apertures 23' for receiving securing bolts for the attaching means to the motorcycle frame.

In operation, when it is desired to connect the side car to the motorcycle, it is only necessary to release the detent 14 and raise the locking plate 21 of each of the attaching members A, move the side car in proper position to allow the several shafts or parts 18 or 18' to be lowered into the bearing 6, and swing the locking plates 21 down to their closed position. Just as soon as these several locking plates have been snapped shut, the side car is ready for use. The work of attachment thus accomplished will have required but a few moments, and the side car may be disconnected by a converse operation in just as brief a time and with just as little effort.

It is customary to allow for a slight vibration between the side car and the motorcycle, but to prevent undue rattling, owing to looseness of parts, it is also customary to provide a spring to take up the play. This spring may assume the form of a flat plate or strap, and, as indicated in Fig. 2, is connected by having its end finished as a shaft 18', or as a shaft 18, if preferred.

The plate 1 in each instance is a socket member and the locking plate 21 serves as a means for closing the edgewise approach to the socket whereby assemblage and disconnection of the side car with respect to the motorcycle is greatly facilitated. Longitudinal approach or release of shaft 18 through socket 6 is, of course, rendered impossible by the head of the shaft.

What I claim is:—

1. An attaching means for side carriers of vehicles, comprising a plate having an undercut socket opening laterally through the plate and also opening edgewise through the plate, the openings being proportioned for permitting only edgewise access to the socket by a headed shaft, the plate being formed with a groove in its edge communicating with the socket and lateral opening, and a closure for the lateral opening adapted to be moved into and out of the groove.

2. An attaching means for side carriers of vehicles, comprising a plate having an undercut socket opening laterally through the plate and also opening edgewise through the plate, the openings being proportioned for permitting only edgewise access to the socket by a headed shaft, the plate being formed with a groove in its edge communicating with the socket and lateral opening, and a closure for the lateral opening having a web adapted to removably fit within and fill the groove, and having a projection for closing the lateral opening.

3. An attaching means for side carriers of vehicles, comprising a plate having an undercut socket opening laterally through the plate and also opening edgewise through the plate, the openings being proportioned for permitting only edgewise access to the socket by a headed shaft, the plate being formed with a groove in its edge communicating with the socket and lateral opening, a closure for the lateral opening having a web adapted to removably fit within and fill the groove, and having a projection for closing the lateral opening, and means for locking the closure in its closing position.

4. An attaching means for side carriers of vehicles, comprising a plate having an undercut socket opening laterally through the plate and also opening edgewise through the plate, the openings being proportioned for permitting only edgewise access to the socket by a headed shaft, the plate being formed with a groove in its edge communicating with the socket and lateral opening, a closure for the lateral opening having a web adapted to removably fit within and fill the groove, and having a projection for closing the lateral opening, the lateral opening flaring away from the line of the shaft and the projection of the closure proportionately and conversely tapering.

5. An attaching means for side carriers of vehicles, comprising a plate having an undercut socket opening laterally through the plate and also opening edgewise through the plate, the socket being of substantially globular contour and adapted to receive a ball-like end of a headed shaft with the shaft extending through the lateral opening, the said lateral opening being flared laterally away from the socket for allowing the shaft to move laterally while being maintained against longitudinal movement.

6. An attaching member adapted to be connected to a vehicle for the detachable attachment thereto of a side carrier, said attaching member comprising a plate having an undercut socket opening laterally through the plate and also having an edgewise opening through the plate proportioned to permit edgewise entrance and exit of a headed shaft to and from the socket, the plate being formed with an edge groove opening into the socket, a locking plate having a web adapted to fill the groove and to close the lateral opening to the socket, and means for detachably locking the locking plate in the closing position.

7. An attaching member adapted to be connected to a vehicle for the detachable attachment thereto of a side carrier, said attaching member comprising a plate having an undercut socket opening laterally through the plate and also having an edgewise opening through the plate proportioned to permit edgewise entrance and exit of a headed shaft to and from the socket, the plate being formed with an edge groove opening into the socket, a locking plate having a web adapted to fill the groove and to close the lateral opening to the socket, means pivotally connecting the locking plate to the socketed plate, and a detent latch for retaining the locking plate from pivotal movement away from the closed position.

In testimony whereof I affix my signature in presence of two witnesses.

GEORGE BEN. PERKINS.

Witnesses:
F. L. POOL,
OSCAR SNELSON.